United States Patent
Tsai

(10) Patent No.: US 9,027,415 B2
(45) Date of Patent: May 12, 2015

(54) FORCE SENSING KICKBOXING APPARATUS AND METHOD OF MANUFACTURE

(71) Applicant: Medal Sports (Taiwan) Corporation, Taipei (TW)

(72) Inventor: Kevin Chunhao Tsai, Kaohsiung (TW)

(73) Assignee: Medal Sports (Taiwan) Corporation, Taipei (TW)

( * ) Notice: Subject to any disclaimer, the term of this patent is extended or adjusted under 35 U.S.C. 154(b) by 80 days.

(21) Appl. No.: 13/918,515

(22) Filed: Jun. 14, 2013

(65) Prior Publication Data
US 2014/0366645 A1   Dec. 18, 2014

(51) Int. Cl.
*G01L 3/16* (2006.01)
*G01L 5/00* (2006.01)
*A63B 69/32* (2006.01)

(52) U.S. Cl.
CPC ............ *G01L 5/0052* (2013.01); *A63B 69/32* (2013.01)

(58) Field of Classification Search
CPC ....... G06F 3/011; A63B 2220/53; G01D 7/10
USPC ...................... 73/862.041–862.046
See application file for complete search history.

(56) References Cited

U.S. PATENT DOCUMENTS

| | | | | |
|---|---|---|---|---|
| 4,658,897 A | * | 4/1987 | Kompanek et al. | 166/249 |
| 6,056,674 A | * | 5/2000 | Cook | 482/83 |
| 6,188,742 B1 | * | 2/2001 | Schousek et al. | 377/19 |
| 7,014,526 B1 | * | 3/2006 | Chamberlin | 446/404 |
| 7,219,729 B2 | * | 5/2007 | Bostick et al. | 166/250.01 |
| 2003/0216228 A1 | * | 11/2003 | Rast | 482/84 |
| 2011/0130183 A1 | * | 6/2011 | Pelletter | 463/7 |
| 2012/0096935 A1 | * | 4/2012 | Finke et al. | 73/152.03 |

* cited by examiner

*Primary Examiner* — Max Noori
(74) *Attorney, Agent, or Firm* — K&L Gates LLP

(57) ABSTRACT

A force sensing kickboxing apparatus and methods of manufacture are disclosed. An example apparatus includes a body including an externally facing first side and an internally facing second side, an electronic device connected to the body and configured to provide information associated with the body, a sensor housing attached to a portion of the second side of the body forming a pocket between the sensor housing and the portion of the internally facing second side, and a sensor positioned within the pocket and communicatively coupled to the electronic device, the sensor configured to detect an object contacting a portion of the first side of the body in proximity to the sensor.

34 Claims, 7 Drawing Sheets

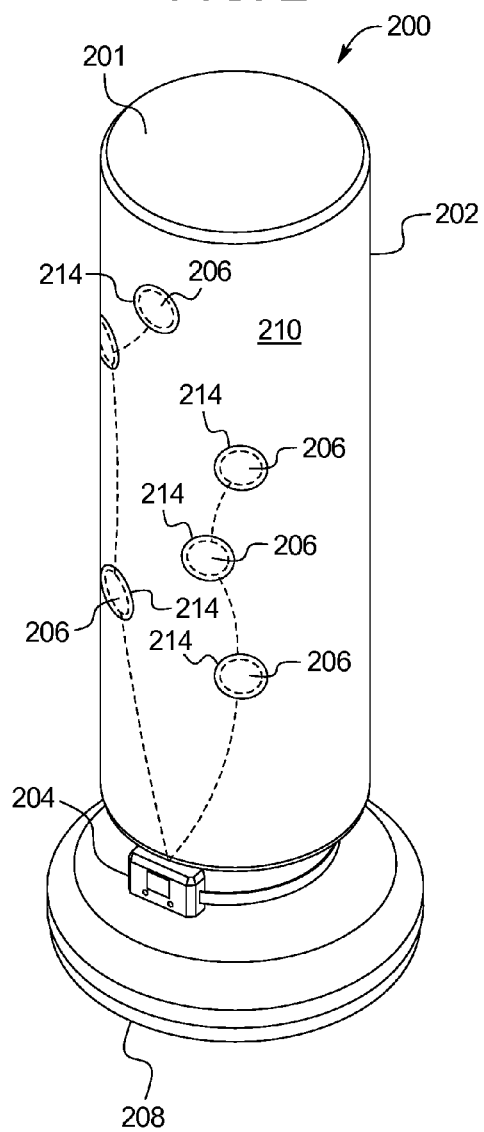
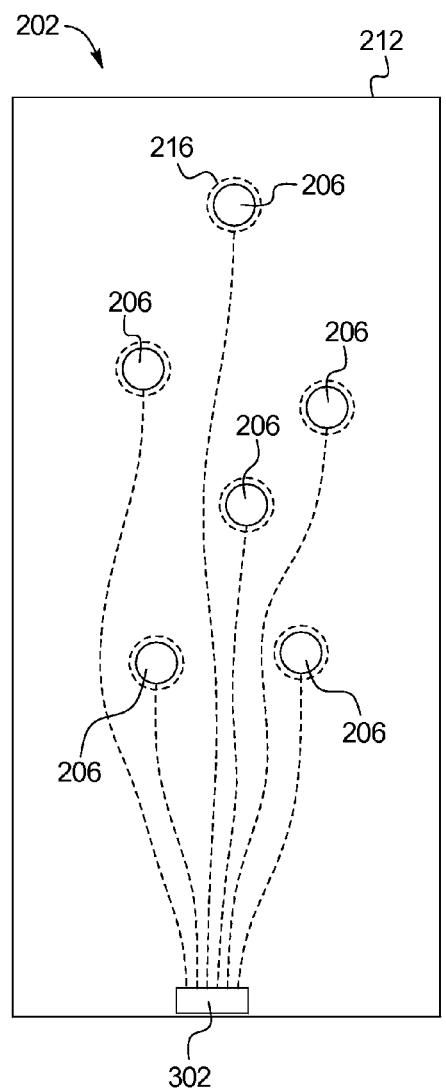

FORCE SENSING KICKBOXING APPARATUS AND METHOD OF MANUFACTURE

BACKGROUND

Recreational punching or strike bags have been in use for many years. More recently, manufacturers have been including sensors and electronic devices to detect and visually/audibly register strikes of particular targets on the punching bag. These sensors have to be durable enough to withstand the constant (and sometimes high) forces while at the same time being sensitive enough to register or detect contact.

FIG. 1 shows a diagram of an exploded partial view of a known punching bag 100, which includes an outer shell 102 and an inner shell 104. The outer shell 102 includes one or more target areas 106 that graphically indicate the locations of respective force sensors 108. The inner shell 104 is configured or designed to align with the outer shell 102 such that each force sensor 108 is directly behind the respective target area 106. This configuration ensures that a force is recorded by the sensor 108 when a user strikes the target area 106.

While the inner shell 104 is shown as a single layer, in many known punching bags 100 the inner shell 104 includes multiple electrical layers separated by foam. A contact of the target area 106 causes one electrical layer to contact another electrical layer through the foam, thereby completing a circuit (similar to triggering a switch). An electronic reader detects a voltage from the completed circuit and registers the contact.

In the illustrated known punching bag 100, the outer shell 102 is connected to the inner shell 104 along the edges or seams of the shells. For instance, a top edge 110 of the outer shell 102 is connected to a top edge of the inner shell 104. This connection causes the inner shell 104 to hang behind the outer shell 102. It should be appreciated that this construction results in an air gap between most of the inner shell 104 and outer shell 102 including the locations of the sensors 108 and target areas 106.

An issue with this configuration is that with repeated use, the inner shell 104 can become misaligned with the outer shell 102. For instance, the top edge 112 could become partially or fully disconnected from the outer shell 102. Additionally or alternatively, the inner shell 104 (including the sensor 108) can become ripped or stretched through use, thereby causing misalignment. In yet other instances, the air gap between the shells 102 and 104 could widen, thereby resulting in reduced sensor sensitivity. As a result of this misalignment, a strike of the target area 106 is not necessarily detected by the sensor 108. There accordingly exists a need to provide an accurate and durable punching apparatus that overcomes at least some of the above mentioned the issues.

SUMMARY

The present disclosure provides a new and innovative force sensing kickboxing apparatus and corresponding method of manufacture. The example kickboxing apparatus is configured such that force detecting sensors are positioned directly behind printed target areas of a body. The sensors are secured to the kickboxing apparatus via a sensor housing. The space formed between the connected sensor housing and the body provides a secure enclosure or pocket for the sensor. This enclosure ensures the sensor is positioned close enough to the target area of the body to detect the force.

Compared to known punching bags, the example configuration described herein provides at least one force detection sensor connected to a main body instead of an inner shell, thereby preventing a misalignment of the sensor from a target area. Placing the sensor closer to the body provides better contact or strike detection accuracy. Moreover, placing the sensor against the body uses relatively less parts than the known system, thereby reducing manufacturing defects, manufacturing costs, and product costs.

In an example embodiment, a kickboxing apparatus includes a body including an externally facing first side and an internally facing second side and an electronic device connected to the body and configured to provide information associated with the body. The kickboxing apparatus also includes a sensor housing attached to a portion of the second side of the body forming a pocket between the sensor housing and the portion of the internally facing second side and a sensor positioned within the pocket and communicatively coupled to the electronic device. The example sensor is configured to detect an object contacting a portion of the first side of the body in proximity to the sensor.

Additional features and advantages of the disclosed system, method, and apparatus are described in, and will be apparent from, the following Detailed Description and the Figures.

BRIEF DESCRIPTION OF THE FIGURES

FIG. 2 shows a diagram of an example kickboxing apparatus, according to an example embodiment of the present disclosure.

FIG. 3 shows a diagram of an internally facing side of a body prior to be formed into the kickboxing apparatus of FIG. 2, according to an example embodiment of the present disclosure.

DETAILED DESCRIPTION

Figure 1:
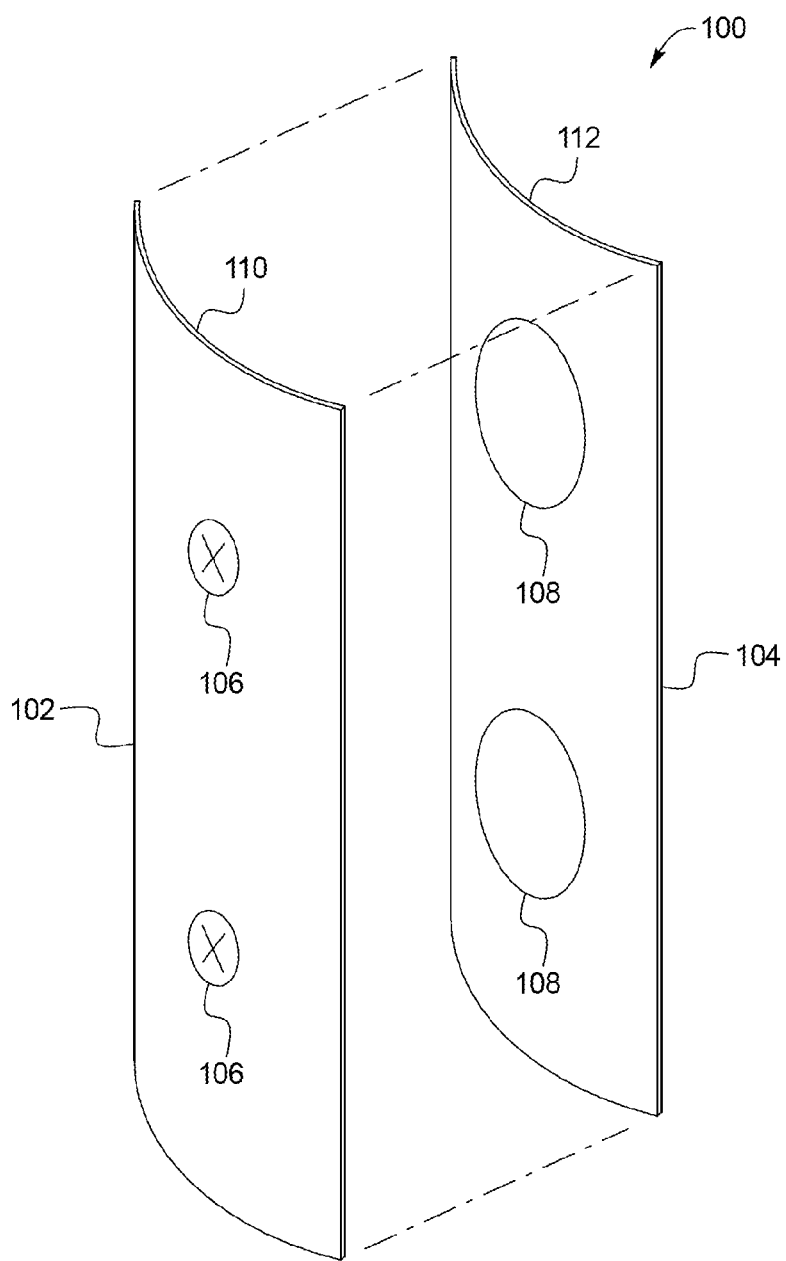
FIG. 1 shows a diagram of an exploded partial view of a known prior art punching bag.

The present disclosure relates in general to a kickboxing game and in particular, to a force sensing kickboxing apparatus and method of manufacture. Throughout the following disclosure reference is made to a kickboxing game that includes an inflatable body with sensors configured to record contact from users. However, it should be appreciated that the apparatus and method of manufacture described herein may be applied to other related applications. For example, the apparatus may be used as a boxing trainer, a judo trainer, a karate trainer, a wrestling trainer, or any other recreational or professional device used to record contact from a user. Moreover, while the kickboxing game is disclosed as including an inflatable body, it should be appreciated that the disclosed apparatus could be applied to solid non-inflatable bodies.

Kickboxing Apparatus

FIG. 2 shows a diagram of an example kickboxing apparatus 200. The example apparatus 200 includes a support member 201, a body 202, an electronic device 204, and sensors 206. The example kickboxing apparatus 200 also includes a base 208 that supports the body 202 and the support member 201. In some embodiments, the base 208 is integrated with the body 202 and/or the support member 201. For example, the base 208 may be comprised of a plastic sheet that is connected to a plastic sheet of the body 202 or the plastic sheet of the support member 201. In other examples, the base 208 is removably connected to the body 202 and/or the support member 201.

In this embodiment, both the base 208 and the support member 201 are inflatable. For example, the base 208 and/or the support member 201 may include a plastic shell or container that is fillable with water or sand. In other embodiments, the base 208 and/or the support member 201 may be solid.

The electronic device 204 is configured to use signals, data, etc. from the sensors 206 to determine or detect a strike or contact (e.g., to provide information regarding the body 202). In some examples, the electronic device 204 may determine the amount of force applied and/or which of the sensors 206 was contacted. Further, the electronic device 204 may provide power to light emitting devices provided in conjunction with the sensors to light portions of the body 202. Moreover, the electronic device 204 may manage or control game play, as described in more detail below.

The example body 202 includes a sheet that is connected to the cylindrical support member 201, which is conducive to receiving strikes and contact from a user. In some examples, the body 202 and/or the support member 201 may include hard plastic, rubber, chemical fiber, etc. In other examples, the support member 201 may comprise one or more plastic sheets combined together to form a cylinder. In these other examples, an interior of the support member 201 may be filled with a gas, liquid, or solid to provide shape and support. It should be appreciated that in other examples, the support member 201 can include other shapes (e.g., cylindrical, figurine, etc.) and/or be comprised of other materials (e.g., rubber, canvas, etc.). As can be appreciated, the support member 201 includes a relatively harder material than the body 202 so as to be able to support the body 202 during use.

The example body 202 may be connected to only a portion of the support member 201 (e.g., a front-facing side). Alternatively, the body 202 may be attached around the entire support member 201, as shown in FIG. 2. It should be appreciated that the sensors 206 are only attached to the body 202 and not the support member 201.

The example body 202 includes an externally facing side 210 and an internally facing side 212. The example externally facing side 210 is configured to include graphics. For example, the externally facing side 210 includes target areas 214, which graphically represent locations of sensors 206. The target areas 214 may be graphically represented as a circular area including an 'X' a number, a letter, and/or any other symbol. Alternatively, the target areas 214 may be graphically represented as individual pictures, symbols, etc.

The externally facing side 210 may also include a picture or figure to induce a user to strike the kickboxing apparatus 200. Examples include a kickboxer, a robot, a boxer, a wrestler, a famous personality, an animated character, etc. The target areas 214 are positioned to be located around sensitive or important areas of the figure. For instance, the target areas 214 may be located at joints and power supply of a graphical robot. In other examples, the externally facing side 210 may not include graphics.

The internally facing side 212 is shown in FIG. 3. This figure shows a diagram of the internally facing side 212 prior to be formed into the kickboxing apparatus 200 of FIG. 2. It should be appreciated that during manufacture, it is relatively easier to print graphics and attach sensors to the body 202 when it is in the form of a flat sheet rather than a formed structure. For instance, during manufacture, plastic sheets comprising the body 202 may be cut into the form shown in FIG. 3. These sheets are then printed and attached to the sensors 206. The sheets may then be rolled into the cylinder shape shown in FIG. 2 and connected to the support member 201 using chemical, mechanical, or heat-based adhesives and/or sealing methods.

As shown in FIG. 3, the internally facing side 212 includes at least one sensor 206. As mentioned above, the sensors 206 are positioned on the internally facing side 212 at locations corresponding to target areas 214 printed or otherwise graphically displayed on the externally facing side 210. Each of the sensors 206 are connected to a wire connector 302, which is connected to the electronic device 204 during manufacture. The wire connector 302 provides a single interface to accumulate the wires from each of the sensors 206 to provide one connection point to the electronic device 204. In other examples, the sensors 206 may be wirelessly communicatively coupled to the electronic device 204. In these other examples, the sensors 206 may include batteries or be wirelessly powered by the electronic device 204. Alternatively, the sensors 206 may include transducers (e.g., a microelectromechanical system ("MEMS") such as a piezoelectric device configured to transduce force into a voltage) that convert force into power. This locally generated power may be used to transmit detection signals to the electronic device 204 and/or to illuminate a light emitting device positioned in proximity to the sensor 206.

The example sensors 206 are connected to the internally facing side 212 of the body 202 using a sensor housing 216. The sensor housing 216 includes a sheet section that encloses the sensor 206. The sensor housing 216 also causes the sensor 206 to be adjacent with the internally facing side 212. This configuration secures the sensors 206 permanently in place in proximity to the target areas 214 and is relatively more durable than the known systems described above. This configuration is also relatively more cost efficient than the known systems because only a sheet portion is used for each sensor 206 instead of an interior inner shell.

Additional Embodiments of the Kickboxing Apparatus

While FIGS. 2 and 3 show the target areas 214 and sensors 206 positioned at varying heights for a portion of the body 202, in other embodiments the target areas 214 and sensors 206 may be positioned around the circumference of the body 202. For example, some target areas 214 and sensors 206 may be positioned on a front-facing side of the externally facing side 210 and other target areas 214 and sensors 206 may be positioned on a rear-facing side. Such a configuration would encourage and/or prompt users to move around the kickboxing apparatus 200.

This configuration of circumferentially positioned target areas 214 and sensors 206 may also be provided in conjunction with a base 208 that rotates the body 202. For example, the electronic device 204 may provide instructions (or electrical signals) causing an electric motor or rotor in the base 208 to rotate the body 202. The electronic device 204 may randomly select the rotation. Alternatively, the rotation may be predetermined based on a timed sequence. It can be appreciated that this rotation may increase the challenge of striking the target areas 214, especially with the inclusion of rear-facing target areas.

Sensor Connectivity Embodiment

Figure 4:
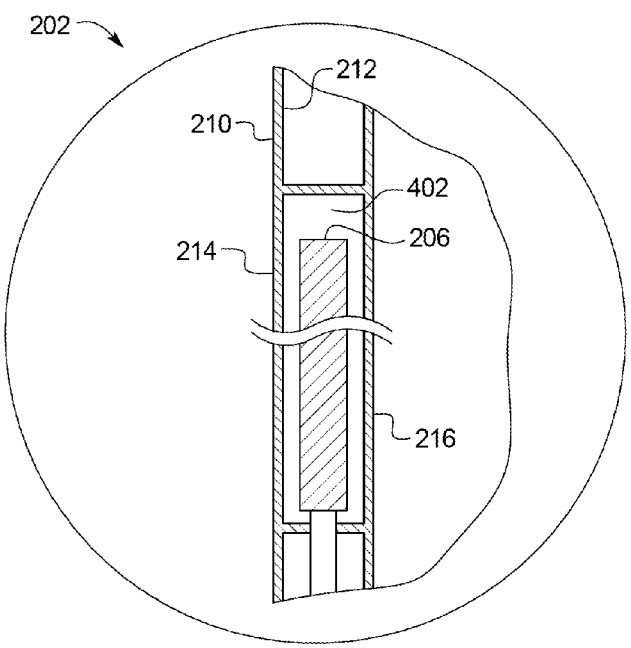
FIGS. 4 and 5 are diagrams illustrating the connectivity of sensors to the internally facing side of the body of FIG. 2, according to an example embodiment of the present disclosure.
Figure 5:
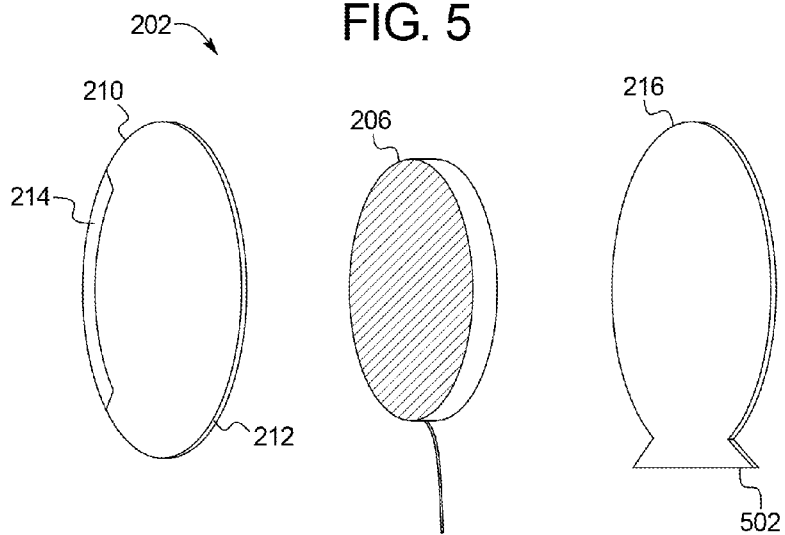

FIGS. 4 and 5 are diagrams illustrating the connectivity of the sensors 206 to the internally facing side 212 of the body 202. In particular, FIG. 4 shows a sensor housing 216 connected to the side 212 and FIG. 5 shows an exploded view of the side 212, sensor 206, and sensor housing 216. In the illustrated examples, the sensor 206 includes a layered printed circuit board ("PCB") that has a circular or oval shape. In some embodiments, the sensor 206 has a thickness between 1 millimeter and 10 millimeters. The example sensor housing 216 includes a roughly circular-shaped plastic portion that includes an area larger than the sensor 206. The sensor housing 216 may include a wire portion 502 configured to enable a wire to be positioned from the sensor 206 to the electronic device 204. In some embodiments, the sensor housing 216 has thickness that is less than 2 millimeters.

In the illustrated embodiments of FIGS. 4 and 5, the senor 206 is positioned against the internally facing side 212 of the body 202 in proximity, adjacent, or otherwise across from the target area 214 printed on the externally facing side 210. In some examples, the internally facing side 212 includes one or more marks indicating where the sensor 206 is to be positioned. The sensor 206 is then secured into place by positioning the sensor housing 216 over the sensor 206 and connecting the edges of the sensor housing 216 to the internally facing side 212, thereby forming a pocket 402 in which the sensor 206 is deposed. It should be noted that at least some of the wire portion 502 is not connected to the internally facing side 212 to enable the wire to pass out of the sensor housing 216.

To secure the sensor 206 in place, the sensor housing 216 is positioned so that at least 1 millimeter of material overhangs or extends from the sensor 206 and contacts the internally facing side 212. The edges of the sensor housing 216 are chemically, mechanically, or otherwise attached to the internally facing side 212. In some examples, localized heating and/or pressure may be applied to cause the edges of the sensor housing 216 to integrate with (e.g., melt into) the internally facing side 212. It should be appreciated that the connection method used should provide a connection between the sensor housing 216 and internally facing side 212 that can withstand the constant impact of the body 202 being struck.

As can be appreciated from FIG. 4, the above described configuration enables the sensor 206 to be secured into place while at the same time not physically connecting any part of the sensor 206 to the body 202 or the sensor housing 216. Instead, the configuration enables the sensor 206 to float in a fixed position of the pocket 402, thereby ensuring that the sensor 206 can accurately detect a contact while at the same time being relatively durable because the sensor 206 is not physically connected to anything. For instance, the amount of overlap of the sensor housing 216 and the amount of sensor housing 216 connected to the internally facing side 212 is selected to provide a large enough pocket 402 to enclose the sensor 206 without actuating the force sensing components of the sensor 206 but close enough to the body 202 to detect contact. For instance, while FIG. 4 shows the pocket as providing some distance (e.g., between 0.5 and 2 millimeters) between the sensor 206 and the side 212/sensor housing 216, in other embodiments, the sensor 206 may contact at least one of the internally facing side 212 and the sensor housing 216. In these other embodiments, the sensor 206 may include a buffer that prevents casual contact from causing contact detection.

Sensor Embodiment

Figure 6:
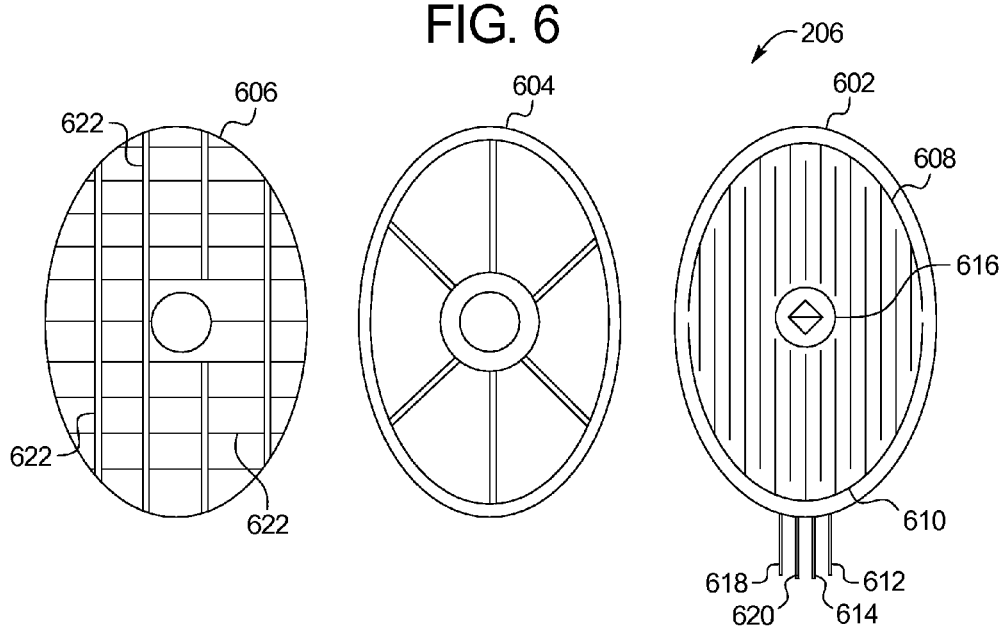
FIG. 6 shows a diagram of an exploded-view of the sensor of FIGS. 2-5, according to an example embodiment of the present disclosure.

FIG. 6 shows a diagram of an exploded-view of the sensor 206 of FIGS. 2-5. It should be appreciated that FIG. 6 provides only one example of sensor 206. For example, the sensor 206 could be configured to have a circular-shape, rectangular-shape, etc., include additional layers and/or components, and/or have different dimensions. Additionally, as described below, different types of sensors 206 could be used in other embodiments.

The example sensor 206 of FIG. 6 includes a circuit board 602, a separation layer 604, and a contact layer 606. The example sensor 206 is formed by placing the separation layer 604 between the contact layer 606 and the circuit board 602. In some instances, the separation layer 604 is secured to the circuit board 602 and the contact layer 606 via pressure provided by a laminate. For example, a plastic-based tape may wrap around the externally facing sides of the contact layer 606 and the circuit board 602 (e.g., the sides not in contact with the separation layer 604) holding the layers 604 and 606 and circuit board 602 in place. In other examples, a chemical adhesive or mechanical fastener may bind the contact layer 606 and separation layer 604 to the circuit board 602.

The example circuit board 602 includes positive conductive traces 608 and negative conductive traces 610. The positive traces 608 are connected to a common positive electrode that receives a positive voltage provided by, for example the electronic device 204 via a wire 612. Similarly, the negative traces 610 are connected to a common negative (or ground) electrode that receives a negative or ground potential provided by the electronic device 204 via a wire 614. In this embodiment, the positive conductive traces 608 are interspaced between the negative conductive traces 610 in an alternating manner.

The example circuit board 602 also includes a light emitting device 616 configured to generate light using power provided by the electronic device 204. The power may be provided via wires 618 and 620 connected respectively to positive and ground potentials. In this embodiment, the light emitting device 616 is shown as being located within a center of the circuit board 602. In other embodiments, the light emitting device 616 can be located along an edge of the circuit board 602 or, alternatively, be adjacent to the circuit board 602. In yet other embodiments, the circuit board 602 may not include a light emitting device 616.

The example circuit board 602 is formed of a hard plastic including, for example, polyvinyl chloride ("PVC"). In other examples, the circuit board 602 may include cured laminates. It should be appreciated that the rigid nature of the circuit board 602 enables the conductive traces 608 and 610 to effectively contact portions of the contact layer 606 during a strike of the sensor 206. This configuration provides relatively accurate detections of contact force. It should also be appreciated that the rigid circuit board 602 can withstand prolonged and extensive forces without ripping, tearing, or otherwise breaking.

The example separation layer 604 includes an elastic porous material that functions as an insulator between the circuit board 602 and the contact layer 606. The separation layer 604 ensures that casual contact (e.g., a force below a predetermined threshold) does not cause the contact layer 606 to contact the circuit board 602. The example separation layer 604 may include foam or other compressible material.

In FIG. 6, the material portion of the separation layer 604 is shown as black lines. The white space of the separation layer 604 corresponds to open space that enables the contact layer 606 to contact the circuit board 602 when a force is applied. It should be appreciated that in other embodiments, the shape of the separation layer 604 may vary based on the circuit board 602 and/or the material used. For example, in other embodiments, the separation layer 604 may be formed into a grid pattern.

The example contact layer 606 of FIG. 6 includes a conductive film 622 arranged in a grid pattern. The conductive film 622 may include any material that provides for at least adequate conductivity (e.g., copper, silver, gold, doped carbon, etc.) for traces (shown as black lines). The traces are deposed on a thin plastic sheet that provides insulation between the traces. The conductive film 622 is arranged in a grid so that horizontal traces intersect at least one positive conductive trace 608 and one negative conductive trace 610 when a force is applied to the sensor 206. As such, the spacing and dimensions of the conductive film 622 may vary based on the dimensions of the separation layer 604, patterning of the conductive traces 608 and 610, and shape/dimension of the contact layer 606.

In an example embodiment of the sensor 206 of FIG. 6, a force is applied to an adjacently located target area 214. The force causes the contact layer 606 to bend inward and compress the separation layer 604. During or after compression, the force further causes portions of the contact layer 606 located opposite the open space of the separation layer 604 to move through the open space toward the circuit board 602. The contact between at least some of the conductive film and the circuit board 602 effectively shorts the contacted positive conductive traces 608 to contacted negative conductive traces 610. The electronic device 204 is configured to detect the short of the conductive traces 608 and 610 and registers that the contact or strike has been detected. The short may be detected by an increase in current to the sensor 206. Alternatively, the short may be determined by detecting an increase in voltage on the wire 614 connected to the negative conductive traces 610.

Other Sensor Embodiments

As mentioned above, the sensor 206 of FIG. 6 is not the only type of sensor that could be used within the kickboxing apparatus 200. For example, the sensor 206 could include a film of piezoresistive elements that generate a differential signal based on an amount of applied force. The electronic device 204 may use a magnitude of the differential signal to determine an amount of force applied.

Alternatively, the sensor 206 could include a pressure sensor that is configured to sense changes in air (or liquid) pressure in the pocket 402 based on an applied force. The sensor 206 can be configured to output a signal when the force exceeds a predetermined threshold or provide a signal representative of the amount of received force. In this embodiment, the electronic device 204 may use a magnitude of the signal to determine an amount of force applied.

In yet other examples, the sensor 206 may include one or more light emitters and one or more light detectors. The detectors may be positioned to detect a strike of the sensor 206 by detecting movement in transmitted light. In this embodiment, the electronic device 204 uses the signals output from the detectors to determine a strike and/or an amount of force associated with the strike.

Electronic Device Embodiments

Figure 7:
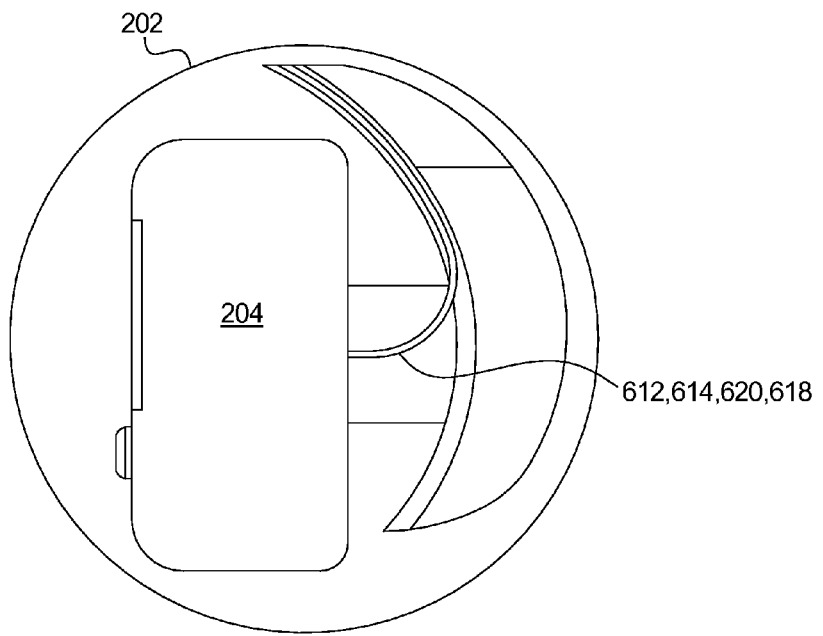
FIG. 7 shows a diagram of an electronic device of the kickboxing apparatus of FIGS. 2 and 3, according to an example embodiment of the present disclosure.

FIG. 7 shows a diagram of the electronic device 204 of FIGS. 2 and 3. The electronic device 204 includes a microprocessor with instructions stored in a memory. The instructions define how a sensor strike is determined and how information associated with the determination is provided to a user. The instructions may be preprogrammed or, alternatively, may be provided by a user.

As discussed above, the electronic device 204 is electrically connected to each of the sensors 206 via respective wires 612, 614, 618, and 620. The wires 618 and 620 provide power to the light emitting device 616 and the wires 612 and 614 are used to detect a signal provided by the sensor 206 responsive to receiving a strike. In other examples, the electronic device 204 may be wirelessly communicatively coupled to each of the sensors 206.

The example electronic device 204 may be configured to provide an AC or DC voltage to the sensor 206 and/or the light emitting device 616. In some instances, the electronic device 204 may only provide power to a sensor 206 and/or a corresponding light emitting device 616 at certain times. For example, the electronic device 204 may apply power to a light emitting device 216 responsive to detecting a strike at a respective sensor 206. Alternatively, the light emitting device 216 may provide power to the light emitting device 616 at certain times as a prompt to a user to strike the corresponding target area 214.

The electronic device 204 can include any type of computing device that is configured to determine when a strike is detected by a sensor 206 and output information associated with the determination. For instance, the electronic device 204 can include a microcontroller, a tablet computer, a smartphone, a processor, an application specific integrated circuit ("ASIC"), etc. The electronic device 204 may be connected to a network via any wired or wireless connection including, for example, 4G LTE, WiFi, etc. to transmit information associated with the determination.

The electronic device 204 may be configured to determine the amount of force. For example, the electronic device 204 may only register a strike if the force is greater than a predetermined threshold (set by a user or a designer). Additionally, the electronic device may display an amount of force detected and/or provide an average of detected forces applied to each or all of the target areas 214. In some examples, the electronic device 204 may be configured to cumulate the force applied to a target area 214, compare the cumulated result to a predetermined threshold, and provide an indication that the target area is 'closed out' when the cumulated force exceeds the threshold.

Information associated with the determination made by the electronic device 204 includes an audio and/or visual indication of a strike upon a target area 214, a number of strikes against the target areas within a time period, an amount of force applied to the target areas, a competitor's number of strikes, etc. The determination may also prompt a user as to which target area to contact. The determination may also include statistical information including strikes per a time period, a frequency of strikes during different time periods, a distribution of force applied to the different target areas, etc.

Method of Manufacture Embodiment

Figure 8:
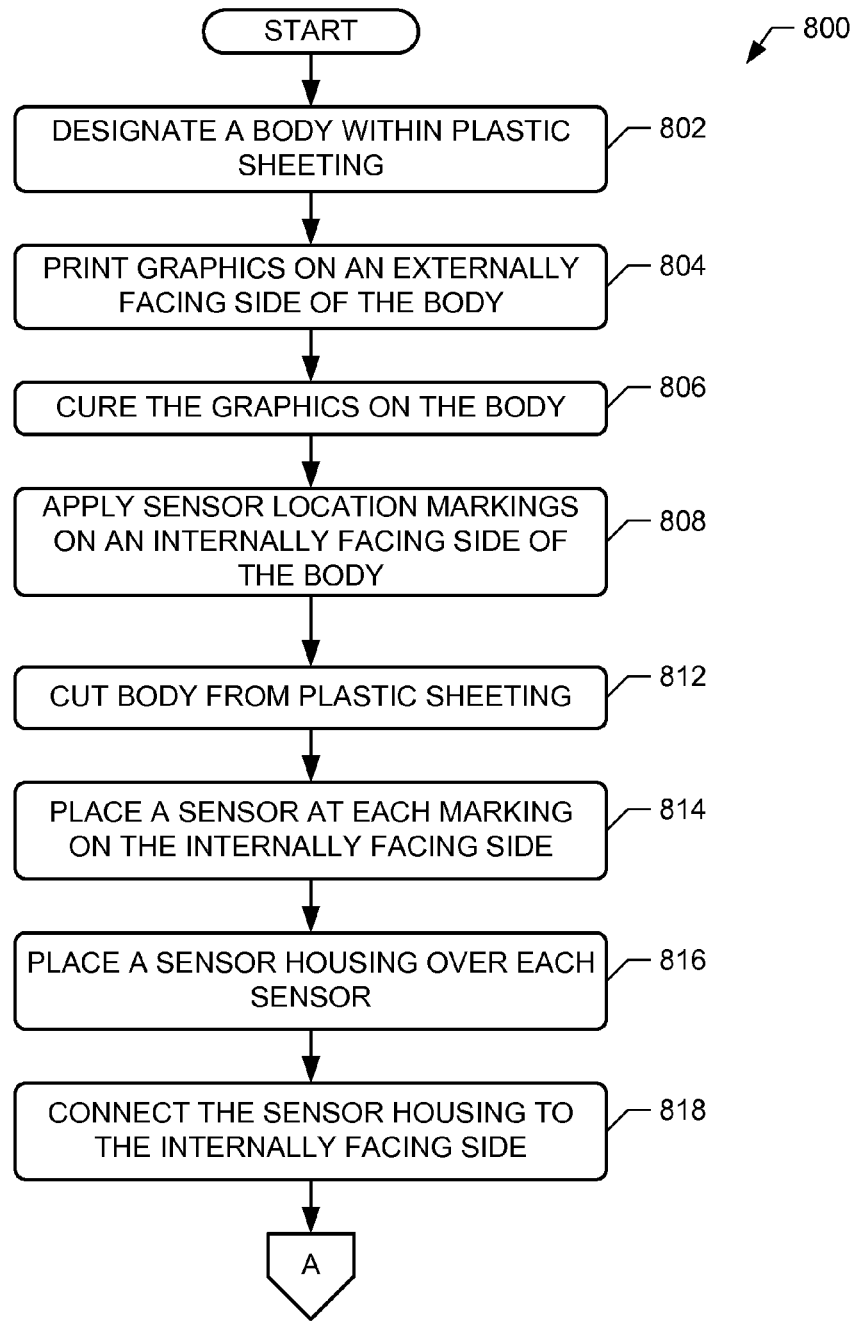
FIGS. 8 and 9 show a flow diagram illustrating example procedures to manufacture the kickboxing apparatus of FIGS. 2 to 7, according to an example embodiment of the present disclosure.
Figure 9:
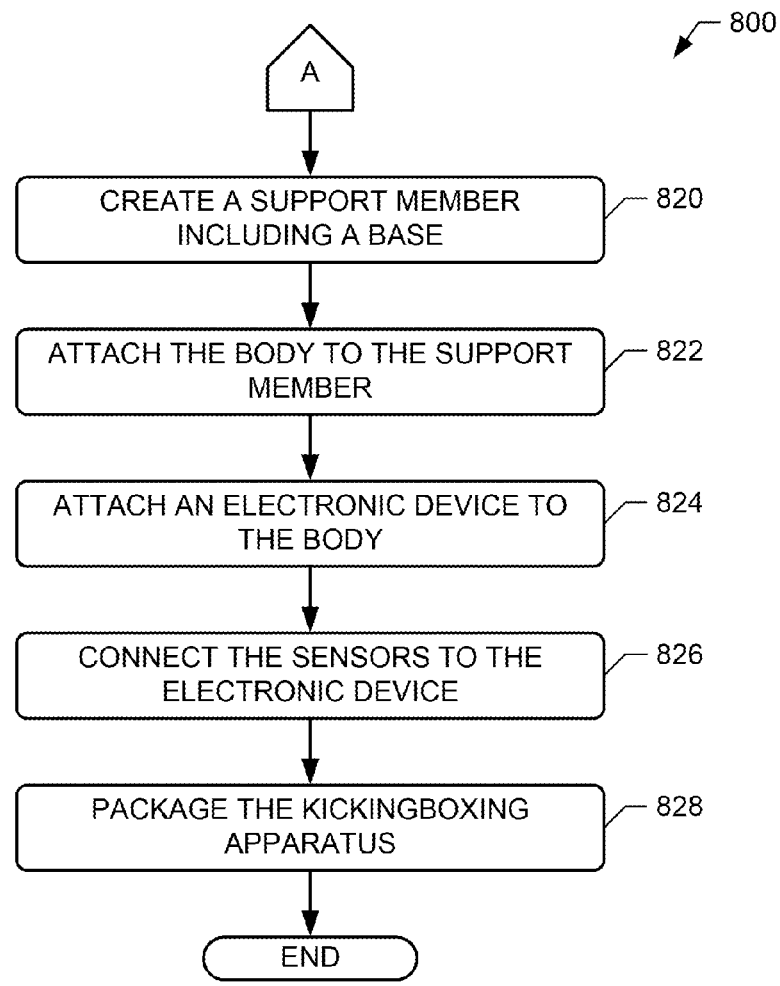

FIGS. 8 and 9 show a flow diagram illustrating example procedure 800 to manufacture the kickboxing apparatus 200 of FIGS. 2 to 7, according to an example embodiment of the present disclosure. The example procedure 800 may be carried out by, for example, machines, computers, and/or servers within a manufacturing facility. It should be appreciated that the example procedure 800 is executed by one or more machines for each kickboxing apparatus 200.

Although the procedure 800 is described with reference to the flow diagram illustrated in FIGS. 8 and 9, it will be appreciated that many other methods of performing the functions associated with the procedure 800 may be used. For example, the order of many of the blocks may be changed, certain blocks may be combined with other blocks, and many of the blocks described are optional. For instance, the present procedure 800 does not include steps for manufacturing sensors 206 and the electronic device 204. In other examples, the procedure 800 may include the steps of combining the circuit board 602 with the separation layer 604 and the contact layer 606 and/or steps of populating a circuit board of the electronic device 204, programming the appropriate components, and placing the circuit board in a housing.

The procedure 800 begins when a plastic sheet (or any other type of material suitable for the body 202) is fabricated and at least one body 202 is designated within the sheet (block 802). The designation can include marking and/or pressing edges of the body 202 in relation to the sheet. The designation may also include cutting the body 202 from the plastic sheet. A machine then prints, or otherwise forms, graphics on an externally facing side 210 of the body 202 (block 804). The graphics include target areas 214. The graphics may also include a character, a design, a picture, etc.

A machine then cures the printed graphics (block 806). Curing can include heating the body 202. In some embodiments, the graphics may be fabricated or integrated with the body 202 during creation of the plastic sheet. In these embodiments, the printing and curing steps may be omitted.

A machine operating the example procedure 800 next applies sensor location markings to an internally facing side 212 of the body 202 (block 808). The markings can include an outline of a sensor 206, lines or points designating a location of at least one edge of a sensor 206, and/or lines or points designating a center of a sensor 206. In embodiments where the body 202 is still attached to a plastic sheet, a machine at this point cuts or detaches the body 202 from the plastic sheet (block 812).

With the body 202 detached, a machine operating the example procedure 800 places a sensor 206 at each of the designated sensor locations on the internally facing side 212 (block 814). At this point, each sensor 206 includes wires that are later connected to the wire connector 302. A machine then places a sensor housing 216 over each sensor 206 (block 816). It should be appreciated that the sensor housings 216 are formed (e.g., cut from plastic sheeting) before or during the steps 802 to 814.

A machine next connects each of the sensor housings 216 to the respective sensor 206 (block 818). FIG. 3 shows an embodiment of the sensors 206 connected to the body 202 (note that the wires from the sensors 206 are connected to the wire connector 302). The dashed lines around each sensor 206 represent the connection between the sensor housing 216 and the internally facing side 212 of the body 202. As described in conjunction with FIGS. 4 and 5, the machine connects the sensor housing using a chemical adhesive and/or a mechanical fastener. The machine may alternatively use a heat press or heat stake to make the connection. It should be noted that the wire portion 502 of the sensor housing 216 is not connected, thereby providing a path for wires 612, 614, 618, and 620 to connect the sensor 206 to an electronic device 204.

Figure 10:
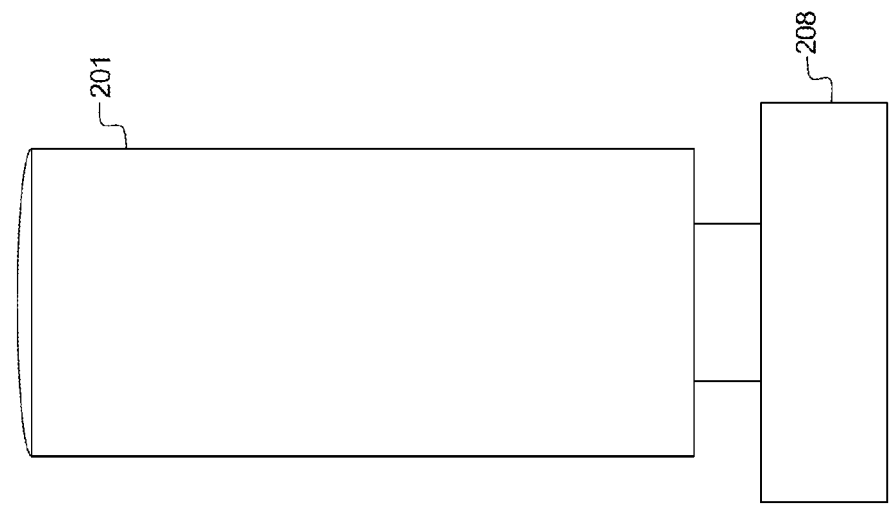
FIG. 10 shows a diagram of an example support member connected to a base prior to attachment of the body of FIGS. 2 and 3, according to an example embodiment of the present disclosure.

A machine then executes the example procedure 800 of FIG. 9 by creating a support member 201 including a base 208 (block 820). FIG. 10 shows diagram of an example of the support member 201 connected to the base 208 prior to attachment of the body 202. The support member 201 and/or base 208 may be formed by combining separate pieces of plastic sheeting. The support member 201 and/or base 208 may also be formed by injection molding. In some embodiments, the support member 201 may be integrated with the base 208. Alternatively, the support member 201 may be permanently connected to the base 208, removably connected to the base 208, or moveably (e.g., rotatably) connected to the base 208.

Figure 11:
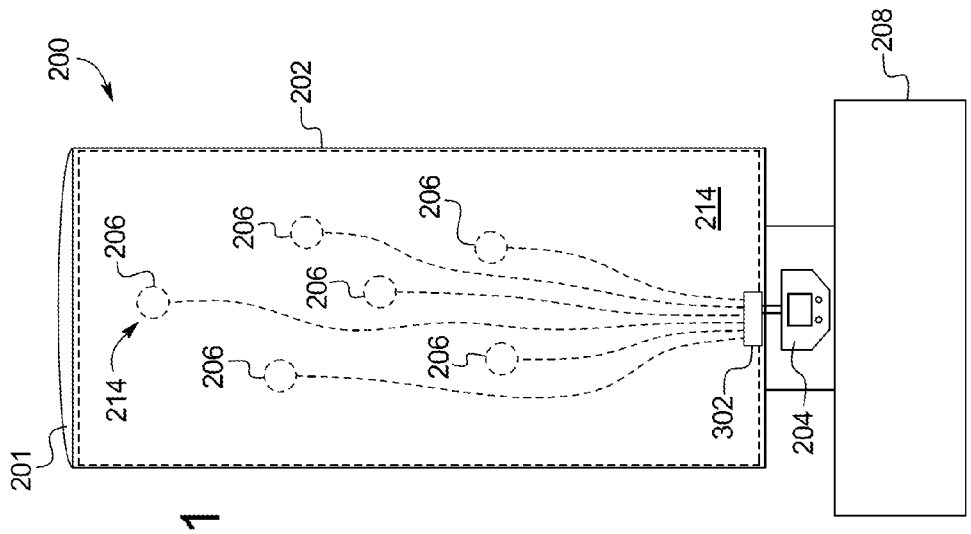
FIG. 11 shows a diagram of the body of FIGS. 2 and 3 connected to the support member of FIG. 10, according to an example embodiment of the present disclosure.

A machine next attaches the body 202 to the support member 201 (block 822). FIG. 11 shows a diagram of the body 202 connected to the support member 201. It should be appreciated that the externally facing side 214 is shown. The dashed lines indicate the locations of the sensors 206 and wires on the internally facing side 212, which are not externally viewable. The body 202 may be attached by heat pressing or heat staking edges of the body 202 to edges or portions of the support member 201. Alternatively, the body 202 maybe chemically and/or mechanically attached to the support member 201. After connecting the body 202, a machine connects the electronic device 204 to the body 202, the base 208, and/or the support member 201 (block 824). In some embodiments, the electronic device 204 is removably connected. In other embodiments, the electronic device 204 is permanently connected.

A machine then connects the wire connector 302 to the electronic device 204 (block 826). At this point, the kickboxing apparatus 200 is finished and may be tested by quality control to ensure there are no manufacturing defects. After inspection, a machine packages the kickboxing apparatus (block 828). The example procedure 800 then ends for this kickboxing apparatus 200.

Conclusion

The relative elegance of the disclosed kickboxing apparatus 200 compared to known punching bag 100 should be readily apparent based on the above disclosure. It should be appreciated that the use of the sensor housing 216 to secure the sensor 206 to the body 202 provides a relatively simple, yet, effective system to detect contacts or strikes from a user. Placing the sensor 206 directly against the body 202 significantly reduces the chances of the sensor 206 being misaligned from a target area 214. Further, there are fewer chances of rips or tears in the connection of the sensor housing 216 to the internally facing side 212 compared to the inner shell 112 of the known punching bag 100 of FIG. 1. Further, positioning the sensor 206 against the body 202 provides for relatively more accurate force detection because there is less material for the force to propagate through. In some ways, the use of the inner shell 112 with the outer shell 110 and the corresponding air gap in the known punching bag 100 functions has a buffer to muffle contact force.

It should also be appreciated that significantly less material is used in the sensor housings 216 compared to the inner shell 112, thereby reducing material costs and chances of product defects. For instance, the inner shell 112 of the known punching bag 100 of FIG. 1 includes a plastic layer for support, a sensor layer and an electrical contact layer for detection, and a foam layer interspaced between the sensor and electrical contact layers. In total, this can comprise one to five square meters of material. In contrast, the sensor housings 216 and sensors 206 have areas that are on the order of tens of square centimeters. The use of fewer materials in the disclosed kickboxing apparatus 200 results in significant material cost reductions. Further, the use of fewer materials reduces inspection costs and the probability of having manufacturing (or material) defects.

It should further be appreciated that the disclosed configuration of the kickboxing apparatus 200 prevents packaging creases to affect performance. For example, the known punching bag 100 of FIG. 1 and the example kickboxing apparatus 200 of FIG. 2 are folded to fit into product packaging. This folding causes creases to form in the shells 102 and 104 and the body 202. The punching bag 100 may have sensing performance reduced if a crease occurs in proximity to a sensor 108 because there is less sensing area to make contact with an applied force. In contrast, the example sensor 206 is positioned directly adjacent to the body 202 such that any creases will not significantly affect the force reaching the contact layer 606. Further, the hard circuit board 602 effectively prevents creases from forming in the sensor 206, thereby improving sensing accuracy.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A force sensing apparatus comprising:
   a body including an externally facing first side and an internally facing second side;
   an electronic device connected to the body and configured to provide information associated with the body;
   a sensor housing; and
   a sensor,
   wherein the sensor housing is attached to a portion of the second side of the body forming a pocket between the sensor housing and the portion of the internally facing second side,
   wherein the sensor is positioned within the pocket and communicatively coupled to the electronic device, the sensor configured to detect an object contacting a portion of the first side of the body in proximity to the sensor,
   wherein the sensor housing is configured to cause the sensor to contact the internally facing second side, and
   wherein the electronic device is configured to count a number of strikes of the body based on data received from the sensor.

2. The force sensing apparatus of claim 1, wherein the sensor is wirelessly coupled to the electronic device.

3. The force sensing apparatus of claim 1, wherein the portion of the first side of the body in proximity to the sensor is graphically shown as a target.

4. The force sensing apparatus of claim 1, wherein the sensor housing is included within a sheet that is molded to the second side of the body around the sensor to form the pocket.

5. The force sensing apparatus of claim 1, wherein the electronic device is configured to wirelessly provide a number of strikes of the body to a user device based on data received from the sensor.

6. The force sensing apparatus of claim 1, wherein the electronic device is configured to provide an audio indication based on data received from the sensor.

7. The force sensing apparatus of claim 1, further comprising:
   a second sensor housing attached to a second portion of the second side of the body forming a second pocket between the second sensor housing and the second portion; and
   a second sensor positioned within the second pocket and communicatively coupled to the electronic device, the second sensor configured to detect the object contacting a second portion of the first side of the body in proximity to the second sensor.

8. The force sensing apparatus of claim 4, further comprising a second sensor housing attached to a second portion of the second side of the body forming a second pocket between the second sensor housing and the second portion of the internally facing second side, wherein the second sensor housing is included within the sheet.

9. The force sensing apparatus of claim 4, wherein the sheet is included within a support structure.

10. A force sensing apparatus comprising:
    a body including an externally facing first side and an internally facing second side;
    an electronic device connected to the body and configured to provide information associated with the body;
    a sensor housing; and a sensor,
    wherein the sensor housing is attached to a portion of the second side of the body forming a pocket between the sensor housing and the portion of the internally facing second side,
    wherein the sensor is positioned within the pocket and communicatively coupled to the electronic device, the sensor configured to detect an object contacting a portion of the first side of the body in proximity to the sensor,
    wherein the sensor housing is configured to cause the sensor to contact the internally facing second side, and
    wherein the sensor includes a light emitting device electrically connected to the electronic device positioned to emit light through the portion of the first side of the body.

11. The force sensing apparatus of claim 10, wherein the electronic device is configured to:
    provide power to the light emitting device; and
    remove power to the light emitting device responsive to detecting the object contacting the portion of the first side of the body.

12. The force sensing apparatus of claim 10, wherein the electronic device is configured to:

provide power to the light emitting device responsive to detecting the object contacting the portion of the first side of the body.

13. A force sensing apparatus comprising:
a body including an externally facing first side and an internally facing second side;
an electronic device connected to the body and configured to provide information associated with the body;
a sensor housing;
a sensor; and
a support structure to which the body is attached,
wherein the sensor housing is attached to a portion of the second side of the body forming a pocket between the sensor housing and the portion of the internally facing second side,
wherein the sensor is positioned within the pocket and communicatively coupled to the electronic device, the sensor configured to detect an object contacting a portion of the first side of the body in proximity to the sensor,
wherein the sensor housing is configured to cause the sensor to contact the internally facing second side, and
wherein the support structure is configured to be inflatable by at least one of water, air, and sand.

14. The force sensing apparatus of claim 13, wherein the sensor housing includes a sheet that is molded to the second side of the body around the sensor to form the pocket.

15. The force sensing apparatus of claim 14, further comprising a second sensor housing attached to a second portion of the second side of the body forming a second pocket between the second sensor housing and the second portion of the internally facing second side, wherein the second sensor housing includes the sheet.

16. The force sensing apparatus of claim 14, wherein the sheet is included within a support structure.

17. A sensing apparatus comprising:
a sensor housing attached to a portion of an interior side of a body forming a pocket between the sensor housing and the portion of the interior side; and
a sensor positioned within the pocket and electrically connected to an electronic device, the sensor configured to detect an object contacting a portion of an exterior side of the body in proximity to the sensor,
wherein the sensor includes:
interspaced conductive traces included on a side of a circuit board, the conductive traces including positive traces connected to a positive voltage and ground traces connected to a detector,
an elastic porous layer positioned to contact the side of the circuit board, and
a conductive film positioned to contact the elastic porous layer.

18. The sensing apparatus of claim 17, wherein responsive to a force being applied to the portion of the first side of the body, the conductive film contacts at least some of the interspaced conductive traces through the elastic porous layer.

19. The sensing apparatus of claim 18, wherein the detector detects the force by measuring the positive voltage applied from the at least some of the positive traces to the ground traces via the conductive film.

20. The sensing apparatus of claim 17, wherein the sensor includes at least one piezoelectric sensor.

21. The sensing apparatus of claim 17, further comprising an electronic device including the detector and configured to provide an indication that the object contacted the portion of the exterior side of the body in proximity to the sensor.

22. The sensing apparatus of claim 17, wherein the sensor housing is included within a sheet that is molded to the interior side of the body around the sensor to form the pocket.

23. The sensing apparatus of claim 22, further comprising a second sensor housing attached to a second portion of the interior side of the body forming a second pocket between the second sensor housing and the second portion of the interior side, wherein the second sensor housing is included within the sheet.

24. The sensing apparatus of claim 22, wherein the sheet is included within a support structure.

25. A method of manufacturing a force sensing apparatus comprising:
forming a plastic sheet body that includes an exterior side and an interior side;
placing a sensor in contact with a portion of the interior side of the body;
placing a sensor housing on top of the sensor such that at least a portion of the sensor housing extends from edges of the sensor; and
connecting the sensor housing to the portion of the interior side of the body causing the sensor to be permanently enclosed between the portion of the interior side of the body and the sensor housing.

26. The method of claim 25, wherein the sensor housing is connected to the portion of the interior side of the body by at least one of a heat stake and a chemical adhesive.

27. The method of claim 25, wherein the exterior side of the plastic sheet body graphically displays a robot that includes numerical targets at locations of sensors.

28. The force sensing apparatus of claim 10, wherein the sensor housing is included within a sheet that is molded to the second side of the body around the sensor to form the pocket.

29. The force sensing apparatus of claim 28, further comprising a second sensor housing attached to a second portion of the second side of the body forming a second pocket between the second sensor housing and the second portion of the internally facing second side, wherein the second sensor housing is included within the sheet.

30. The force sensing apparatus of claim 28, wherein the sheet is included within a support structure.

31. The method of claim 25, wherein the sensor housing is included within a first portion of a sheet that is molded to the interior side of the body around the sensor.

32. The method of claim 31, further comprising:
placing a second sensor in contact with a second portion of the interior side of the body;
placing the sheet on top of the second sensor such that at least a second portion of the sheet extends from edges of the second sensor; and
connecting the second portion of the sheet to the second portion of the interior side of the body causing the second sensor to be permanently enclosed between the second portion of the interior side of the body and the second portion of the sheet.

33. The method of claim 31, wherein the sheet is included within a support structure.

34. A force sensing apparatus comprising:
a body including an externally facing first side and an internally facing second side;
an electronic device connected to the body and configured to provide information associated with the body;
a support structure to which the body is attached, the support structure being configured to be inflatable by at least one of water, air, and sand and including:
a first sensor housing attached to a first portion of the second side of the body forming a first pocket between the first sensor housing and the first portion of the internally facing second side, and a second sensor housing attached to a second portion of the second side of the body forming a second pocket between the second sensor housing and the second portion of the internally facing second side;

a first sensor positioned within the first pocket and communicatively coupled to the electronic device; and a second sensor positioned within the second pocket and communicatively coupled to the electronic device, wherein the first and second sensors are configured to detect an object contacting respective portions of the first side of the body in proximity to the first and second sensors wherein the first sensor housing is configured to cause the first sensor to contact the first portion of the internally facing side, and wherein the second sensor housing is configured to cause the second sensor to contact the second portion of the internally facing second side.

\* \* \* \* \*